United States Patent
Exsted

(10) Patent No.: US 6,274,701 B1
(45) Date of Patent: Aug. 14, 2001

(54) CROSS-LINKABLE MELAMINE COATING COMPOSITIONS

(75) Inventor: Bert J. Exsted, St. Paul, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/703,534

(22) Filed: Nov. 1, 2000

Related U.S. Application Data

(62) Division of application No. 09/303,329, filed on Apr. 30, 1999, now Pat. No. 6,183,853.

(51) Int. Cl.⁷ .................................................. G08G 73/00
(52) U.S. Cl. .......................................... 528/422; 528/425
(58) Field of Search ..................... 528/422, 425

(56) References Cited

U.S. PATENT DOCUMENTS

| | | | |
|---|---|---|---|
| 3,252,932 | 5/1966 | Bolstad et al. | 260/29.4 |
| 3,960,983 | 6/1976 | Blank | 260/839 |
| 5,286,279 | 2/1994 | Wu | 95/45 |
| 5,286,382 | 2/1994 | Scarmoutzos et al. | 210/490 |
| 5,554,414 | 9/1996 | Moya et al. | 427/244 |

FOREIGN PATENT DOCUMENTS 61-089263   5/1986  (JP).

*Primary Examiner*—Morton Foelak
(74) *Attorney, Agent, or Firm*—Douglas B. Little

(57) ABSTRACT

Curable coating compositions containing melamine precursors comprising:
(a) a compound of the formula

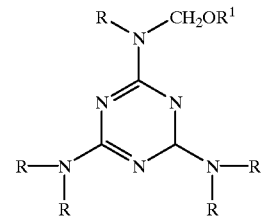

wherein R is each, independently, H, $CH_2OH$ or $CH_2OR^2$, and $R^1$ and $R^2$ are each, independently, alkyl having 1 to 4 carbon atoms;
(b) an alcohol, preferably a polyhydric alcohol; and
(c) either
  (i) a perfluoroalkyl alcohol of the formula

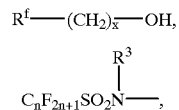

in which $R^f$ is $C_nF_{2n+1}$ or
where x is 1–12; n is 3–20, and $R^3$ is H, alkyl of 1–4 carbon atoms or —$(CH_2)_x$—OH, or (ii) a polyvalent salt.

These compositions can be cured thermally with a catalyst and provide unique advantages as coatings for porous materials.

10 Claims, No Drawings

CROSS-LINKABLE MELAMINE COATING COMPOSITIONS

This is a divisional of application Ser. No. 09/303,329 filed Apr. 30, 1999 now U.S. Pat. No. 6,183,853.

FIELD OF THE INVENTION

This invention relates to porous materials containing melamine resins that exhibit air permeability and repellency to liquids.

BACKGROUND OF THE INVENTION

Melamine resins first appeared in Europe and later in America, a few years before World War II. Unlike phenolic resins, they have no objectionable odor, yet can be made into flexible to extremely hard lustrous surface coatings that are not easily stained. This is predominately attributed to the remarkable stability of the melamine's triazine ring after being cross-linked into an insoluble matrix. As a cross-linker, melamines have been introduced into molding, laminating, coating, gluing, and textile finishing.

One useful technology for producing microporous materials is thermally induced phase transition (TIPT). The TIPT process is based on the use of a polymer that is soluble in a diluent at an elevated temperature and insoluble in the diluent or forms a gel at a relatively lower temperature. The phase transition can involve a solid-liquid phase separation, a liquid-liquid phase separation or a liquid to gel phase transition. This technology has been employed in the preparation of microporous materials wherein a thermoplastic polymer and a diluent are separated by a liquid-liquid phase separation as described in U.S. Pat. Nos. 4,247,498 and 4,867,881. A solid-liquid phase separation has been described wherein the thermoplastic polymer on cooling crystallizes out. U.S. Pat. Nos. 4,539,256 (Shipman), 4,726,989 and 5,120,594 (Mrozinski) and 5,260,360 (Mrozinski et al.) describe such films containing a multiplicity of spaced, randomly dispersed, nonuniform shaped, equipped particles of a thermoplastic polymer, optionally coated with a liquid that is immiscible with the polymer at the crystallization temperature of the polymer. Microporous films made by a phase transition from a liquid to a gel have been described in U.S. Pat. No. 4,849,311. Micropores allow permeability to gases, including moisture vapor, but can be relatively impermeable to high surface tension liquids such as water.

SUMMARY OF THE INVENTION

The present invention comprises melamine coated microporous materials, microporous materials containing salts, and related articles. The melamine is a cross-linker that is thermally cured and covalently bonded to various nucleophiles (e.g., hydrocarbon or modified hydrocarbon alcohols, etc.). When the nucleophile is a fluorinated monol or polyol, the resulting coating imparts fluid repellencies to the porous substrate against aqueous or organic solvents, while still maintaining the film's microporous morphology. Melamine saturation of porous substrates renders them essentially nonporous. Nevertheless, such nonporous, cross-linked melamine/ether polyol composites still retain a breathability feature.

The series of melamine coated microporous materials of the present invention may further include polyvalent salts incorporated into an ether/melamine coating. Such a combination enhances the hydrophilicity (water wettability) of the resulting coatings.

Accordingly, the present invention is generally described as a coated porous material (such as a porous film) which comprises a porous material and a coating composition applied to said material derived from the following precursors:

(i) a compound of the formula

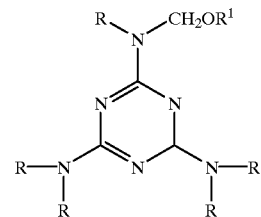

wherein R is each independently H, $CH_2OH$ or $CH_2OR^2$, and $R^1$ and $R^2$ are each independently alkyl having 1 to 4 carbon atoms; and (ii) an alcohol selected from the group consisting of perfluoroalkyl alcohols of the formula

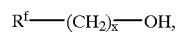

in which $R^f$ is $C_nF_{2n+1}$ or

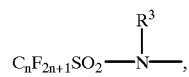

where x is 1–12; n is 3–20, and $R^3$ is H, alkyl of 1–4 carbon atoms or $-(CH_2)_x-OH$, and polyhydric alcohols.

The coated porous material, after the coating composition has been cured, has an air flow Gurley Number equal or less than 2,000 sec/50 cc of air.

The coating composition of the inventive coated porous material may comprise both a perfluoroalkyl alcohol and a polyhdric alcohol (different from the perfluoroalkyl alcohol).

The inventive coated porous materials can be formulated to include polyvalent cations bound within the porous material which cations are not removed by water extraction. For example, coated microporous films can be made hydrophilic as depicted below.

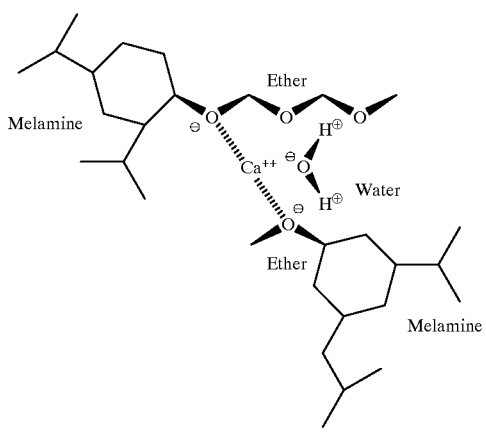

In this case, a multivalent (or polyvalent) salt was incorporated into an ether/melamine coating formulation on the porous material thereby enhancing its hydrophilicity, while immobilizing the salt via secondary bonding forces (eg. polar or ionic) between the cation and the melamine ether chains. Thus, the invention includes a porous material containing polar groups and polyvalent salts bound within the porous material.

The invention also includes within its scope a composite, which is a material made by saturation of a porous substrate with the above described melamine coating composition, which has been cured.

Another aspect of the present invention is a process or method of making a coated porous or nonporous material, i.e. a composite, which includes the following steps:

applying a curable coating composition as above defined in a solvent, on a porous material to cover at least a portion of the material, and drying the resulting coating sufficiently to remove the solvent and to promote cross-linking or curing, to produce the coated membrane.

Depending on the amount of coating composition applied, the resulting coating membrane may retain its porosity or become nonporous. An effective amount of coating composition to afford a coated membrane having an air-flow Gurley Number of equal or less than 2,000 sec/50 cc of air affords a coated porous material. This coated material is repellent against fluids such as hydrophilic and hydro-/oleophobic solvents while maintaining the microporous morphology of the film.

Saturation of the porous substrate with the above described coating composition renders the morphologies nonporous. This composite of non-porous, cross-linked melamine polyol still retains a breathability feature, i.e. air permeability. Thus, the melamine coated non-porous substrate composites are useful, as breathable high performance barrier films in protective garments. Cured thermally with a catalyst, the above melamine formulations provide a definite processing advantage in that their room temperature pot-life upon mixing is not compromised by any viscosity and/or workable time limitations.

Curable coating compositions containing melamine precursors are also part of the invention. These compositions comprise:

(a) a compound of the formula

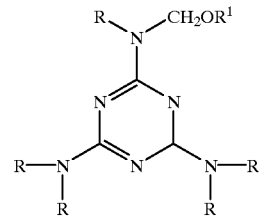

I wherein R is each, independently, H, $CH_2OH$ or $CH_2OR^2$, and $R^1$ and $R^2$ are each, independently, alkyl having 1 to 4 carbon atoms;

(b) an alcohol, preferably a polyhydric alcohol; and (c) either (i) a perfluoroalkyl alcohol of the formula

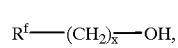

II in which $R^f$ is $C_nF_{2n+1}$ or

where x is 1–12; n is 3–20, and $R^3$ is H, alkyl of 1–4 carbon atoms or —$(CH_2)_x$—OH, or (ii) a polyvalent salt;

which coating composition is capable of cross-linking.

The coated porous materials of the present invention, which include non-woven and woven materials and microporous membranes, retain their liquid repellency and moisture vapor permeability properties for extended periods in many types of applications.

DETAILED DESCRIPTION

Coated porous materials, e.g. microporous polyolefin membrane materials, of the present invention exhibit significant air permeability properties and repel aqueous-based as well as a wide variety of non-aqueous based liquids.

Coated porous materials of the present invention exhibit durability of their fluid repellency properties when subjected to rubbing, touching, folding, flexing or abrasive contact. They also display oleophobic properties, resisting penetration by oils and greases and may be heat sealable. The oleophobicity of the membrane materials is most surprising in that the membrane materials contain an oily, oleophilic processing compound which, a priori, one would expect, would promote wetting by other oleophilic materials and which also would inhibit heat sealing.

Transport of a liquid through most porous materials or fabrics occurs because the liquid is able to wet the material. A possible route through the material is for the liquid to initially wet the surface of the material and to subsequently enter the pore openings at the surface of the material through capillary action followed by a progressive wetting of and travel through the interconnected pores until finally reaching the opposite surface of the material. If the liquid has difficulty wetting the material, liquid penetration into and through the material will, for the most part, be reduced. A similar phenomenon occurs in the pores, where reduced wettability, in turn, reduces pore invasion. Generally the greater the numerical difference between the surface tension of the liquid and the surface energy of the porous material (the latter being lower), the less likely it is that the liquid will wet the porous material.

In the case of aqueous solutions containing surface active agents, the wetting of the porous materials is usually time-dependent, controlled by the slow diffusion and absorption of surfactants onto the surface of the porous materials.

The oleophobic, hydrophobic, moisture permeable, air permeable, coated porous materials of the present invention may be prepared by topically applying a melamine curable coating composition to a porous material by any suitable method such as, for example, spray or roll-on application, through dip coating or transfer coating techniques. Following the application, the coating is dried sufficiently to remove solvent and to promote cross- linking or curing of the melamine coated membrane.

The present invention also includes composite materials or films. These are nonporous coated materials which have the same repellent properties as above described for the coated porous materials and the coatings are also applied in the same manner.

These nonporous materials are breathable and are prepared by saturating porous substrates with the melamine coating composition. The TIPT composite film is similar to a solid monolithic material and represents a preferred embodiment. These composites are important in developing breathable barrier film in which porosity is not desired but breathability is preferred. The composites are thus useful in various protective garments, e.g. surgical gowns that prevent penetration by blood and pass ASTM ES-22 viral testing, agricultural suits that hold out pesticides/herbicides, paint applicator apparel that guard against solvent/pigment penetration of clothing/skin, clean room attire that maintain dust/lint-free environments, and the like. In addition to protective garments, the composites may also be used for mattress/pillow covers, diapers and the like.

A typical porous material of this invention has a pore size less than about 250 micrometers. Preferably the pore size is from about 0.01 to about 250 micrometers. The materials include non-woven and woven materials. Polymeric materials used to make porous films include polyurethane, polyesters, polycarbonates, polyamides, and preferably polytetrafluoroethylene and polyolefins. The porous films may also be referred to as microporous membranes.

Examples of membranes which are made by thermally induced phase transition (TIPT) include crystalline polyolefin membranes described, for example, in U.S. Pat. No. 4,539,256 (Shipman), U.S. Pat. No. 4,726,989 (Mrozinski), U.S. Pat. No. 4,863,792 (Mrozinski), U.S. Pat. No. 4,824,718 (Hwang), U.S. Pat. No. 5,120,594 (Mrozinski) and U.S. 5,260,360 (Mrozinski); liquid phase separation membranes described, for example, in U.S. Pat. No. 4,247,498 (Castro) and U.S. Pat. No. 4,867,881 (Kinzer); gel separation membranes described, for example, in U.S. Pat. No. 4,849,311 (Itoh); and membranes containing cross-linked diluent described, for example, in U.S. application Ser. No. 09/081239 (Exsted) each of which is incorporated herein by reference.

As used herein, the term "gel" means a highly viscous mixture comprised of a high molecular weight polymer and a liquid diluent at a concentration (e.g. 1–50 or more specifically 2–20 weight percent polymer) sufficient to form a three-dimensional polymer network in the presence of the diluent phase. It is thought that polymer network is formed by chemical or physical cross-linking. The gelation process is reversible (i.e. with increasing temperature, a gel can revert to a liquid solution). The tendency to form a gel is a function of polymer molecular weight. Ultra high molecular weight polyethylene mixed with a diluent is known to form a gel upon cooling.

Further, the curable coating compositions can be topically applied to materials such as stretched PTFE, as mentioned above, or particle loaded films which do not contain a diluent or compatible liquid. The compatible liquid may be removed from the microporous polyolefin sheet material, either before or after the sheet has been oriented, to form a diluent-free microporous polymeric material. The compatible liquid can be removed by, for example, solvent extraction, volatilization, or any other convenient method.

Crystallizable olefin polymers suitable for use in the preparation of coated microporous membrane materials of the present invention are melt processable under conventional processing conditions. That is, on heating, they will soften and/or melt to permit processing in conventional equipment, such as an extruder, to form a sheet, tube, filament or hollow fiber. Crystallizable polymers, upon cooling their melt under controlled conditions, spontaneously form geometrically regular and ordered chemical structures.

Examples of suitable commercially available polyolefins include block copolymers or other copolymers of ethylene and propylene, or other polymers, such as polyethylene, polypropylene and polybutylene polymers which can be used singularly or in a mixture.

In addition to the above, TIPT films and membranes also include melt-processible polymeric mixtures made of two polymer components. Both polymer components are miscible in a compatible liquid or diluent when heated above the melting point of the first component or the liquid-liquid phase separation temperature and they separate from the diluent or compatible liquid when cooled, and retain film-like properties.

Materials suitable as processing compounds for blending with crystallizable polymer to make the microporous membrane materials are liquids or solids which are not solvents for the crystallizable polymer at room temperature. However, at the melt temperature of the crystallizable polymer the compounds become good solvents for the polymer and dissolve it to form a homogeneous solution. The homogeneous solution is extruded through, for example, a film die, and on cooling to or below the crystallization temperature of the crystallizable polymer, there is a phase separation.

Preferably, these second phase compounds have a boiling point at atmospheric pressure at least as high as the melting temperature of the polymer. However, compounds having lower boiling points may be used in those instances in which superatmospheric pressure may be employed to elevate the boiling point of the compound to a temperature at least as high as the melting temperature of the polymer. Generally, suitable second phase compounds have solubility parameter and a hydrogen bonding parameter within a few units of the values of these same parameters for the polymer.

Some examples of blends of olefin polymers and processing compounds which are useful in preparing microporous materials in accordance with the present invention include: polypropylene with mineral oil, dibenzylether, dibutyl phthalate, dioctylphthalate, linseed oil, or mineral spirits; polyethylene with xylene, decalin, decanoic acid, oleic acid, decyl alcohol, diethyl phthalate, dioctyl phthalate, mineral oil, linseed oil, or mineral sprits, and polyethylene-polypropylene copolymers with mineral oil, linseed oil, or mineral spirits. Typical blending ratios are 3 to 80 weight percent polymer and 20 to 97 weight percent blending compound.

If additional higher level of repellency is desired, the diluent may comprise a cross-linkable oil. Such oils form solutions with a polymer component at or above the melting point, phase separation point, or gel point of the polymer component. Following the process of forming the microporous film and orienting the film to provide the porosity, the cross-linkable oil is cross-linked in the film.

As cross-linkable oils, included are either synthetic or natural alkyds of the unsaturated oil family. The natural drying oils are those extracted from seeds or trees and are, for example, linseed oil, soybean oil, tall oil, tung oil, oitica oil, corn oil, safflower oil, sunflower oil, grapeseed oil, hemp oil, perilla oil, poppyseed oil, rubberseed oil and walnut oil. The synthetic alkyds are modified drying oils or polyesters modified with polybasic acids, e.g., phthalic acid. These may be categorized into four types depending on their fatty acid content. Those containing 30–40% fatty acid are considered short alkyds, medium alkyds are those containing 43–54% fatty acid. The long alkyds are those containing 55–68% fatty acid and the very long alkyds are those containing greater than 68% fatty acid. The fatty acid derivatives are, for example, oleic, linoleic, and linolenic acids.

Preferred cross-linkable oils are the natural oils such as, for example, linseed oil, sunflower oil, safflower oil and tall oil. The most preferred oil is linseed oil.

Cross-linking accelerators are used to enhance the cross-linking process which occurs oxidatively. The amount of accelerator, when used, is typically from about 0.001 to about 2% of the weight of the total cross-linkable oil, depending on the cross-linking accelerator that is used. Such cross-linking accelerators are, for example, metal driers such as, for example, cobalt, manganese, cerium, vanadium, or iron, and polymerizable driers such as, for example, lead, zirconium, rare earth metals, aluminum or bismuth. Auxiliary modifiers may also be employed such as, for example, calcium, potassium, lithium or zinc. The preferred cross-linking accelerators are the metal driers; cobalt is especially preferred.

The curable coating composition includes a combination of a melamine resin, a polyhydric alcohol and a perfluoroalkyl alcohol. A polyvalent salt may also be incorporated in the composition, if desired. These components are mixed in an organic solvent and the resulting solution is applied as above described to the porous material (eg. microporous polyolefin membrane). The composition contains at least equimolar amounts of melamine and alcohol. Preferably, an excess of melamine may be used.

A compound of the formula I, as above defined, may be employed as the melamine component in the curable coating composition of the present invention. Preferred are compounds of the above formula where $R^1$ is methyl. Also preferred are the hexaalkoxymelamines and most preferred is a compound of the above formula where $R^1$ and $R^2$ are both methyl, especially, hexametboxymelamine. Such melamine resins are commercially available from the Solutia, Inc., St. Louis, Mo., and are called RESIMENES™.

The polyhydric alcohol includes any multifunctional monomer alcohol having at least two hydroxyl groups. Preferred polyhydric alcohols are those having 2 to 8 carbon atoms and preferably being a diol or triol. Particularly useful are, for example, 1,4-butane diol, neopentyl glycol or trimethylol propane.

Preferred perfluoroalkyl alcohols are those of formula II, defined above, wherein R is

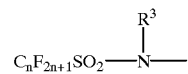

in which x is 1–4, and $R^3$ is methyl, ethyl or $CH_2OH$. Most preferred is the perfluoroalkyl alcohol of formula II wherein $R^f$ is

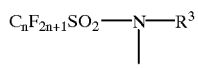

in which n is 8, and x is 2 and $R^3$ is methyl.

The curable coatings can be cured by methods known in the art such as heating.

The polyvalent salt mentioned in the summary above must have at least one cation having at least divalency (eg. $Ca^{++}$) to promote secondary cross-linking. A preferred salt is a salt having a divalent cation, e.g. $Ca^{++}$, and include, for example, calcium chloride, calcium sulfate and calcium carbonate. Incorporation of a polyvalent salt in the ether/melamine composition results in a coating composition with enhanced hydrophilicity. During the cross-linking process, the polyvalent cation of the salt forms polar or ionic bonds on the melamine/ether chains. This provides unique properties for the resulting coating which still remains hydrophilic (and can be rewetted) after being purged with water, dried, and heated to steam sterilization conditions. Porous hydrophilic membranes of this invention may be applied in water/particle filtratrion or graphic imaging or printing (ie. label stock). Good wettability would provide low lateral spreading of inks applied to the inventive coated substrates yielding good contrast.

The above components of the curable coating composition are combined in a solvent in which the solution contains from about 2 to about 50 wt-% solids, preferably from about 5–20 wt-% solids. A most preferred composition contains about 10–15 wt-% solids. This solution is applied as described above to the porous material. The resulting coating is dried by thermal means sufficiently to remove the solvent and to promote cross-linking or curing.

As an optional ingredient, a catalyst with or without a blocking agent may be used to enhance the cross-linking of the components of the curable coating composition. Such catalysts are well-known in the art and may include (a) blocked acids;
(b) sulfonic acids;
(c) phosphate acids;
(d) Lewis acids
(e) carboxylic acids Preferable catalysts include, e.g., blocked catalysts such as 2-amino-2-methyl-1-propanol blocked p-toluenesulfonic acid, triethylamine blocked p-toluenesulfonic acid, dimethylaminoethanol blocked p-toluenesulfonic acid, ammonium chloride, which upon heating liberate free acids for reactive acceleration and significantly enhance pot-life; sulfonic acids such as p-toluenesulfonic acid, dinonylnapthalene monosulfonic acid, dinonylnapthalene disulfonic acid, dodecylbenzene sulfonic acid; phosphate acids such as butyl acid phosphate, phenyl acid phosphate; Lewis acids such as magnesium bromide, magnesium nitrate, zinc nitrate; and carboxylic acids such as hydroxyated resins containing free or salted carboxylic acid tethers and/or end-groups.

Solvents are useful to facilitate the application of the precursors. Useful solvents include, for example, ethers such as dioxane, tetrahydrofuran, ethylpropyl ether; an amide such as formamide, dimethylformamide or acetamide; ketones such as acetone, methylethyl ketone, methylisopropyl ketone or methylisobutyl ketone; esters such as methyl acetate, ethyl acetate, propyl acetate or butyl acetate; water and mixtures thereof Such solvent is added usually in an amount of from about 50 to about 98 wt-%, preferably about 80–95 wt-%. The most preferred amount of solvent is about 85–90 wt-% and the preferred solvent employed is a ketone such as methylethyl ketone.

Certain conventional additive materials may also be blended in limited quantities with the curable coating composition. Additive levels should be chosen so as not to interfere with the formation of the cured melamine coatings or to result in unwanted exuding of the additive. Such additives may include, for example, dyes, pigments, plasticizers, ultraviolet light (UV) absorbers, antioxidants, bactericides, fungicides, ionizing radiation resistant additives, and the like. Additive levels should typically be less than about 10% of the weight of the polymer component, preferably less than about 2% by weight.

In the following non4imiting examples, all parts and percentages are by weight unless otherwise indicated. In evaluating the materials of the invention and the comparative materials, the following test methods are used.

EXAMPLES

Test Methods

Gurley Air Flow

This value is a measurement of time in seconds required to pass 50 cc of air through a film according to ASTM D-726 Method B. A value of greater than 10,000 sec/50 cc is assigned if the Gurley timer does not start after 100 seconds from the start of the test.

Oil Repellency

The oil repellency of a membrane is determined by placing on the membrane several drops of various solutions from an SPS-3010 Oil Test Kit available from Minnesota Mining and Manufacturing Company (3M), St. Paul, Minn. Values range form 0–10 where 2 means a membrane resists wetting by 65:35 mineral oil:bexadecane mixture for 30 seconds and 8 means a membrane resisted wetting by 100% heptane for 30 seconds. A higher value indicates greater oil repellency.

Water Repellency

The water repellency of a membrane is determined by placing on the membrane several drops of various solutions from an SPS-3011 Aqueous Test Kit available from 3M. Values range form 0–10 where 1 means a membrane resists wetting by 10% aqueous solution of isopropanol for 30 seconds and 10 means a membrane resisted wetting by 100% mineral oil for 30 seconds. A higher value indicates greater water repellancy.

Water Wick

A drop of water was placed on the sample and observed to see if the drop would wick into the coated membrane. If the drop disappeared after 10 seconds, the sample was said to have wicked. If the drop remained substantially unmoved, the sample was said to not have wicked.

Water Flow

The flow of water through a membrane was determined by placing a circular sample, diameter of 4.7 cm, into a 47 mm Gelman magnetic filter funnel (300 ml; Pall Corp., East Hills, N.Y.). 100 mL of water was poured over the sample and a vacuum of 53 kPa (7.7 psi) was applied to the other side of the membrane to pull the water through. The sample was air dried and the test was repeated. Time was measured for the water to pass through the membrane and an average time was reported.

All parts are expressed as parts by weight.

Materials Used

| Material | Description |
| --- | --- |
| Resimene ™ 747 | Hexamethoxymethylmelamine available from Solutia, Inc., St. Louis, Missouri. |
| Fluorocarbon A | N,N-bis(2-hydroxyethyl)perfluorooctanesulfonamide prepared as in U.S. Pat. No. 2,803,656. |
| Fluorocarbon B | N,N-bis(2-hydroxyethyl)perfluorohexanesulfonamide prepared as in U.S. Pat. No. 2,803,656. |
| Fluorocarbon C | N,N-bis(2-hydroxyethyl)perfluorobutanesulfonamide prepared as in U.S. Pat. No. 2,803,656. |
| Fluorocarbon D | perfluoropolyethylene oxide diol prepared as in U.S. Pat. No. 5,384,374. |
| Fluorocarbon E | N,Methyl-2-hydroxyethylperfluorooctanesulfonamide prepared as in U.S. Pat. No. 2,803,656. |
| Hydrocarbon A | 2-butyl-2-ethyl-1,3-propanediol available from Eastman Chemical Co., Kingsport, Tennessee. |
| Hydrocarbon B | hydroxypivalylhydroxypivalate available from Eastman Chemical Co., Kingsport, Tennessee. |
| Hydrocarbon C | 1,4-butanediol available from Aldrich Chemical Co., Milwaukee, Wisconsin. |
| Hydrocarbon D | Carbowax (PEG 1000) Polyethylene glycol available from Union Carbide Chemical Co., Danbury, Connecticut |

Examples 1–5 and Comparative Example 1

Various microporous films were made to illustrate the effect of the carbon backbone of the fluorocarbon alcohol on porosity and performance characteristics.

In Example 1, a coating solution was prepared by mixing 150 parts Fluorocarbon A, 38 parts Resimene™ 747 and 2 parts of a catalyst, paratoluenesulfonic acid available from Aldrich Chemical Co. in 2375 parts methyl ethyl ketone (MEK), available from Aldrich Chemical Co. to make a 7.4 weight percent solids solution. The solution was poured on to a microporous membrane and spread by passing a glass rod at a speed of about 10 cm/sec over the membrane that had been suspended in an embroidery hoop and supported underneath with a 10 mm thick wood board covered with cloth. The membrane was a 33 micrometer ($\mu$m) thick microporous polypropylene membrane containing mineral oil in the pores made in accordance with U.S. Pat. No. 4,726,989 having 35% mineral oil content and made with phthalocyanine blue as the nucleating agent. The coated membrane was air dried for 30 seconds and placed in an oven set at about 120° C. for about 10 minutes to cure the coating. The type and amount of Fluorocarbon and amount of Resimene™ 747 (R-747) are listed in Table 1.

Examples 2–5 were made as Example 1 except the type and amount of fluorocarbon was changed as shown in Table 1 and the amount of Resimene™ 747 used in Example 5 was 24 parts.

Comparative Example 1 was the uncoated porous membrane of Example 1.

Each sample was tested for Gurley Air Flow and Oil Repellency. Values are reported in Table 1.

TABLE 1

| Example | Fluorocarbon type | Fluorocarbon parts | R-747 parts | Solution wt % solids | Gurley sec/50 cc | Oil Repellency |
|---|---|---|---|---|---|---|
| 1 | A | 150 | 38 | 7.4 | 700 | 1 |
| 2 | B | 150 | 44 | 7.6 | 450 | 1 |
| 3 | C | 150 | 50 | 7.8 | 69 | 1 |
| 4 | D | 150 | 22 | 6.8 | 60 | 1 |
| 5 | E | 101 | 58 | 5.1 | 120 | 1 |
| C1 | none | none | none | N/A | 67 | 0 |

As seen in the above table, the porosity (as measured by Gurley air flow) decreased as the chain length of the flurorcarbon alcohol increased for similar flurorcarbon alcohols and some oil repellency was observed.

Examples 6–9

Various microporous films were made to illustrate the effect of a mixture of two alcohols on performance characteristics.

Examples 6–9 were made as Example 1 except various fluorocarbon alcohols were used, some of each was replaced with various hydrocarbon diols or fluorocarbon alcohol, and the solutions were all at 5.1 weight percent. The fluorocarbon alcohol and diols of Examples 6–9 were Fluorocarbon A/Hydrocarbon A, Fluorocarbon A/Hydrocarbon B, Fluorocarbon A/Fluorocarbon E and Fluorocarbon E/Hydrocarbon C, respectively. The amounts of the flurocarbon alcohol, the diol and Resimene™ 747 (R-747) are listed in Table 2.

Each sample was tested for Gurley Air Flow and Oil Repellency. Values are reported in Table 2.

TABLE 2

| Example | Fluorocarbon alcohol parts | Diol parts | R-747 parts | Gurley sec/50 cc | Oil Repel |
|---|---|---|---|---|---|
| 6 | 58 | 16 | 51 | 190 | 1 |
| 7 | 56 | 19 | 50 | 400 | 1 |
| 8 | 33 | 63 | 29 | 500 | 1 |
| 9 | 90 | 4 | 31 | 200 | 1 |

As seen in Table 2, mixing alcohols did not adversely affect oil repellency.

Examples 10–13

Various microporous films were made to illustrate the effect of coating thickness on performance characteristics.

Examples 10–11 were made as Example 1 except a pair of alcohols were used and amounts of the alcohols and Resimene™ 747 were varied, and the solutions were all 5.1 weight percent. The alcohols in Example 10–11 were Fluorocarbon E/Hydrocarbon B. The amounts of the fluorocarbon alcohol, the diol and Resimene™ 747 (R-747) are listed in Table 3.

Examples 12–13 were made as Examples 10–11, respectively, except the coatings were applied three times in succession, dried and cured, to create thicker coatings.

Each sample was tested for Gurley Air Flow and Oil Repellency. Values are reported in Table 3.

TABLE 3

| Example | Fluorocarbon alcohol parts | Diol parts | R-747 parts | Gurley sec/50 cc | Oil Repel |
|---|---|---|---|---|---|
| 10 | 76 | 14 | 35 | 70 | 1 |
| 11 | 87 | 8 | 30 | 80 | 1 |
| 12 | 76 | 14 | 35 | 115 | 2 |
| 13 | 87 | 8 | 30 | 150 | 2 |

As seen in Table 3, increased coating thickness increased oil repellancy and decreased porosity (as measured by Gurley air flow).

Examples 14–16 and Comparative Example 2

Various microporous films were made to illustrate the effect of cross-linked diluent in the membrane on performance characteristics.

Example 14 was made as Example 10 except that a different porous membrane was used, it was made with a cross-linked diluent, and the melamine coating was cured at 93° C. instead of 120° C. A polymer component (high density polyethylene available as HDPE 1285, melting point 131° C. from Fina Oil & Chemical Co., Dallas, Tex.) was fed into the hopper of a 25 mm diameter twin-screw extruder. A mixture of a cross-linkable diluent (linseed oil available under a trade designation Linseed Oil Supreme LSO from Cargill) and a cross-linking accelerator (a cobalt-based accelator available as Cobalt Code #72 from OMG/Mooney Chemicals, Cleveland, Ohio) in a weight ratio of 10,000 to 2 was introduced into the extruder through an injection port located near the feed end of the extruder at a rate to provide a composition of 40% by weight of polymer and 60% by weight of diluent. The overall feed rate through the extruder was 3.2 kg/hr. The polymer was heated to 271° C. in the extruder to melt and, after mixing with the diluent, the temperature was maintained at 232° C. during extrusion. The melt was extruded through a 30.5 cm-wide coat hanger slit die and cast as a 75 $\mu$m-thick transparent film onto a casting wheel maintained at 54° C. and having a patterned surface (comprising a multiplicity of small pyramid-shaped indentations) that provided about 10% land or contact area with the cast film. The cast film was stretched 2×2 (ie., by a factor of 2 in both the machine direction and the transverse direction) times at 99° C. and wound up as a 50 $\mu$m thick microporous film. The linseed oil diluent was allowed to cross-link before the film was coated.

Example 15 was made as Example 14 except the coating solution was similar to that used for Example 11.

Example 16 was made as Example 14 except the coating solution contained a different mixture of alcohols, and the amounts of alcohols and Resimene™ 747 were changed. The alcohols were Flurorcarbon E and Hydrocarbon A. The amounts of the fluorocarbon, diol and Resimene™ 747 (R-747) are listed in Table 4.

Comparative Example 2 was the uncoated porous membrane of Example 14.

Each sample was tested for Gurley Air Flow and Oil Repellency. Values are reported in Table 4.

TABLE 4

| Example | Fluorocarbon alcohol parts | Diol parts | R-747 parts | Gurley sec/50 cc | Oil Repel |
|---|---|---|---|---|---|
| 14 | 76 | 14 | 35 | 930 | 5 |
| 15 | 87 | 8 | 30 | 465 | 4 |
| 16 | 63 | 18 | 44 | 300 | 4 |
| C-2 | none | none | none | 250 | 0 |

As seen in Table 4, use of porous membranes with cross-linked diluent decreased porosity and increased oil repellency.

Examples 17–18 and Comparative Example 3

Various microporous films were made to illustrate the effect of coating thickness as varied by the percent solids of the solution and the absence or presence of cross-linked diluent on performance characteristics of films made with polyethylene membranes.

Example 17 was made as Example 1 except the porous membrane was different, the coating method was different, and the percent solids of the solution was changed to 10 wt. percent, and the melamine resin coating was cured at 93° C. instead of 120° C. The coating was applied with a gravure coater designed to apply a wet coating having a thickness of about 12 micrometers. The porous membrane was a 51 micrometer (μm) thick, microporous, high density polyethylene membrane available as "oil-out" CoTran porous film from 3M. The amounts of the Fluorocarbon A and Resimene™ 747 (R-747) are listed in Table 5.

Example 18 was made as Example 17 using the porous membrane (containing cross-linked linseed oil in the pores) used in Example 14 except that the coating solution was different, the second alcohol being Fluorocarbon E. The amounts of the fluorocarbon, second alcohol and Resimene 747 (R-747) are listed in Table 5.

Comparative Example 3 was the uncoated porous membrane of Example 18.

Each sample was tested for Gurley Air Flow, Oil Repellency and Water Repellancy. Values are reported in Table 5 together with those of Comparative Example 2.

TABLE 5

| Example | Fluorocarbon Diol parts | Second alcohol parts | R-747 parts | Solution wt. % solids | Gurley sec/50 cc | Oil Repel | Water Repel |
|---|---|---|---|---|---|---|---|
| 17 | 150 | 0 | 38 | 10 | 47 | 7 | 10 |
| 18 | 33 | 66 | 29 | 15 | 10,000+ | 7 | 6 |
| C-3 | none | none | none | N/A | 27 | 0 | 2 |
| C-2 | none | none | none | N/A | 250 | 0 | 0 |

As seen in Table 5, increased coating solids applied by the gravure method resulted in increased oil repellency and water repellency. Air flow was blocked for Example 18 which had the coating with higher solids content and the membrane containing cross-inked diluent.

Examples 19–20 and Comparative Example 4

Various microporous films were made to illustrate the effect of the absence or presence of diluent on performance characteristics of films made with another type of membrane.

Example 19 was made as Example 1 except the porous membrane and the percent solids of the coating solution were different. The porous membrane was a 95 μm thick "oil-out" polypropylene membrane made according to U.S. Pat. No. 4,726,989 except the polymer to oil weight ratio was 31:69. The coating solution was 10 weight percent solids and was applied by a gravure coater as in Example 17.

Example 20 was made as Example 18 except the porous membrane was different. The porous membrane was a 75 μm thick "oil-in" (not cross-linked oil) polypropylene membrane made according to U.S. Pat. No. 4,726,989 except the polymer to oil weight ratio was 65:35.

Comparative Examples 4 and 5 were the uncoated porous membranes of Examples 19 and 20 respectively.

Each sample was tested for Gurley Air Flow, Oil Repellency and Water Repellancy. Values are reported in Table 6 together with those of Comparative Example 1.

TABLE 6

| Example | Fluorocarbon Diol parts | Second Diol parts | R-747 parts | Gurley sec/50 cc | Oil Repel | Water Repel |
|---|---|---|---|---|---|---|
| 19 | 150 | 0 | 38 | 12 | 7 | 10 |
| 20 | 33 | 66 | 29 | 440 | 1 | 7 |
| C-4 | none | none | none | 4 | 0 | 2 |
| C-5 | none | none | none | 240 | 0 | 2 |

As seen in Table 6, significant oil repellency was observed with the "oil-out" membrane of Example 19. On the other hand, oil repellency was slightly improved over C-5 for the "oil-in" membrane of Example 20.

Examples 21–22

Various microporous films were made to illustrate the effect of covalently bound salt on performance characteristics.

Example 21 was made as Example 1 except that: the porous membrane was different; some of the coating components were changed; the coating solution had a weight percent solids of 20; and curing was at 93° C. for 20 minutes. The porous membrane was a 108 μm thick "oil-out" porous polypropylene membrane with a Gurley Air Flow of 2.2 sec/cc made according to U.S. Pat. No. 4,726,989 except the polymer:oil weight ratio was 31:69. Hydrocarbon D was used instead of Flurorcarbon A. The amount of Hydrocarbon D (HC-D) and Resimene 747 (R-747) are listed in Table 7.

Example 22 was made as Example 21 except a salt was added. The salt (calcium chloride in the amount of 40 parts) was dissolved in 50/50 by weight water/acetone solvent at a concentration of 20 wt. percent solids and was added to the coating solution. The solution containing $CaCl_2$ was used to coat the porous polypropylene membrane. The amounts of Hydrocarbon D (HC-D), the salt, and Resimene™ 747 (R-747) are listed in Table 7.

Each sample was tested for Gurley Air Flow, Water Wick and Water Flow. Data are reported in Table 7.

TABLE 7

| Example | HCD parts | Salt parts | R-747 parts | Gurley sec/50 cc | Water Wick | Water Flow |
|---|---|---|---|---|---|---|
| 21 | 152 | none | 40 | 2.3 | no | none |
| 22 | 152 | 40 | 40 | 2.2 | yes | 20 |

As seen in Table 7, use of bound salt made the porous membrane hydrophilic.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A curable coating composition comprising:

(a) a compound of the formula;

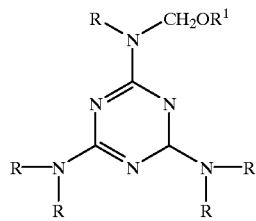

wherein R is each, independently, H, CH$_2$OH or CH$_2$OR$^2$, and R$^1$ and R$^2$ are each independently alkyl having 1 to 4 carbon atoms;

(b) a polyhydric alcohol; and (c) a perfluoroalkyl alcohol of the formula

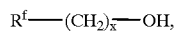

in which R$^f$ is C$_n$F$_{2n+1}$ or

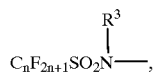

where x is 1–12; n is 3–20, and R$^3$ is H, alkyl of 1–4 carbon atoms or —(CH$_2$)$_x$—OH, wherein said composition is capable of cross-linking.

2. A curable coating composition comprising:

(a) a compound of the formula;

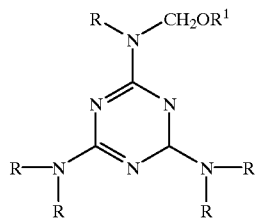

wherein R is each independently H, CH$_2$OH or CH$_2$OR$^2$, and R$^1$ and R$^2$ are each independently alkyl having 1 to 4 carbon atoms;

(b) a polyhydric alcohol; and (c) a polyvalent salt.

3. The coating composition of claim 1 wherein the polyhydric alcohol is selected from diols and triols having 2 to 8 carbon atoms.

4. The composition of claim 2, wherein the polyhydric alcohol is selected from the group consisting of 1,4-butane diol, neopentylglycol and trimethylolpropane.

5. The coating composition of claim 1 wherein the perfluoroalkyl alcohol is selected from the group consisting of: N,N-bis(2-hydroxyethyl)perfluorooctanesulfonamide; N,N-bis(2-hydroxyethyl)perfluorohexanesulfonamide; N,N-bis(2-hydroxyethyl) perfluorobutanesulfonamide; perfluoropolyethylene oxide diol; and N,Methyl-2-hydroxyethylperfluorooctanesulfonamide.

6. The coating composition of claim 1 which further comprises a catalyst selected from the group consisting of: blocked acids; sulfonic acids; phosphate acids; Lewis acids; and carboxylic acids.

7. The coating composition of claim 6 wherein the catalyst is paratoluenesulfonic acid.

8. The coating composition of claim 6 wherein the polyvalent salt has a divalent cation.

9. The coating composition of claim 8 wherein the divalent cation is Ca$^{++}$.

10. The coating composition of claim 9 wherein the polyvalent salt is selected from the group consisting of calcium chloride, calcium sulfate, and calcium carbonate.

* * * * *

UNITED STATES PATENT AND TRADEMARK OFFICE
CERTIFICATE OF CORRECTION

PATENT NO. : 6,274,701 B1
DATED : August 14, 2001
INVENTOR(S) : Bert J. Exsted

It is certified that error appears in the above-identified patent and that said Letters Patent is hereby corrected as shown below:

Title page,
Item [57], ABSTRACT, "in which $R^f$ is $C_nF_{2n+1}$ or" should be moved before "$C_nF_{2n+1}SO_2N\underset{\underset{R^3}{|}}{-}$,"

Column 1,
Line 41, "equipped" should read -- equiaxed --;

Column 7,
Line 61, "hexametboxymelamine." should read -- hexamethoxymelamine --;

Column 9,
Line 12, "therof" should read -- thereof. --;
Line 27, "non4imiting" should read -- non-limiting --;

Column 13,
Line 42, "Repellancy." should read -- Repellency. --;

Column 16,
Line 20, "claim 2," should read -- claim 3 --,; and
Line 35, "claim 6" should read -- claim 2 --.

Signed and Sealed this

Twenty-seventh Day of May, 2003

JAMES E. ROGAN
*Director of the United States Patent and Trademark Office*